United States Patent [19]

Zinck

[11] Patent Number: 4,620,599

[45] Date of Patent: Nov. 4, 1986

[54] GROUND WORKING MACHINE FOR HOEING, TILLING AND THE LIKE

[76] Inventor: Wolf D. Zinck, Dessauerstrasse 32, D-6550 Bad Kreuznach, Fed. Rep. of Germany

[21] Appl. No.: 554,354

[22] Filed: Nov. 22, 1983

[30] Foreign Application Priority Data

Nov. 29, 1982 [DE] Fed. Rep. of Germany ....... 3244132
Nov. 29, 1982 [DE] Fed. Rep. of Germany ....... 3244133
Nov. 29, 1982 [DE] Fed. Rep. of Germany ....... 3244134

[51] Int. Cl.$^4$ .............................................. A01B 33/02
[52] U.S. Cl. ......................................... 172/42; 172/49
[58] Field of Search ................. 172/42, 43, 41, 49, 172/123, 48, 52, 50, 51, 56, 60

[56] References Cited

U.S. PATENT DOCUMENTS

| | | | |
|---|---|---|---|
| 2,063,769 | 12/1936 | Suelflow | 172/42 |
| 2,485,057 | 10/1949 | McCormick | 172/52 |
| 3,773,112 | 11/1973 | Zinck | 172/42 |
| 3,937,285 | 2/1976 | Lely | 172/68 |
| 3,945,441 | 3/1976 | Lely | 172/68 |
| 4,402,366 | 9/1983 | Dankel | 172/43 |

FOREIGN PATENT DOCUMENTS

| | | | |
|---|---|---|---|
| 1048060 | 12/1959 | Fed. Rep. of Germany | 172/42 |
| 1108500 | 6/1961 | Fed. Rep. of Germany | 172/42 |
| 2382837 | 11/1978 | France | 172/49 |
| 975001 | 11/1964 | United Kingdom | 172/42 |

*Primary Examiner*—Richard J. Johnson
*Attorney, Agent, or Firm*—Larson & Taylor

[57] ABSTRACT

A ground-working machine is proposed for hoeing, tilling or similar, with two motor-driven, rotating power take-off shafts, mounted crosswise to the direction of travel. The power take-off shafts carry the tools. In order to ensure a high performance, the bearing points of the power take-off shafts are laterally offset from each other in the direction of travel. In a further model of execution, the power take-off shafts each sit in a transmission block, which transmission block is coupled to the motor. To change the distance between both power take-off shafts in the direction of travel, the transmission blocks can swivel in relation to each other.

14 Claims, 5 Drawing Figures

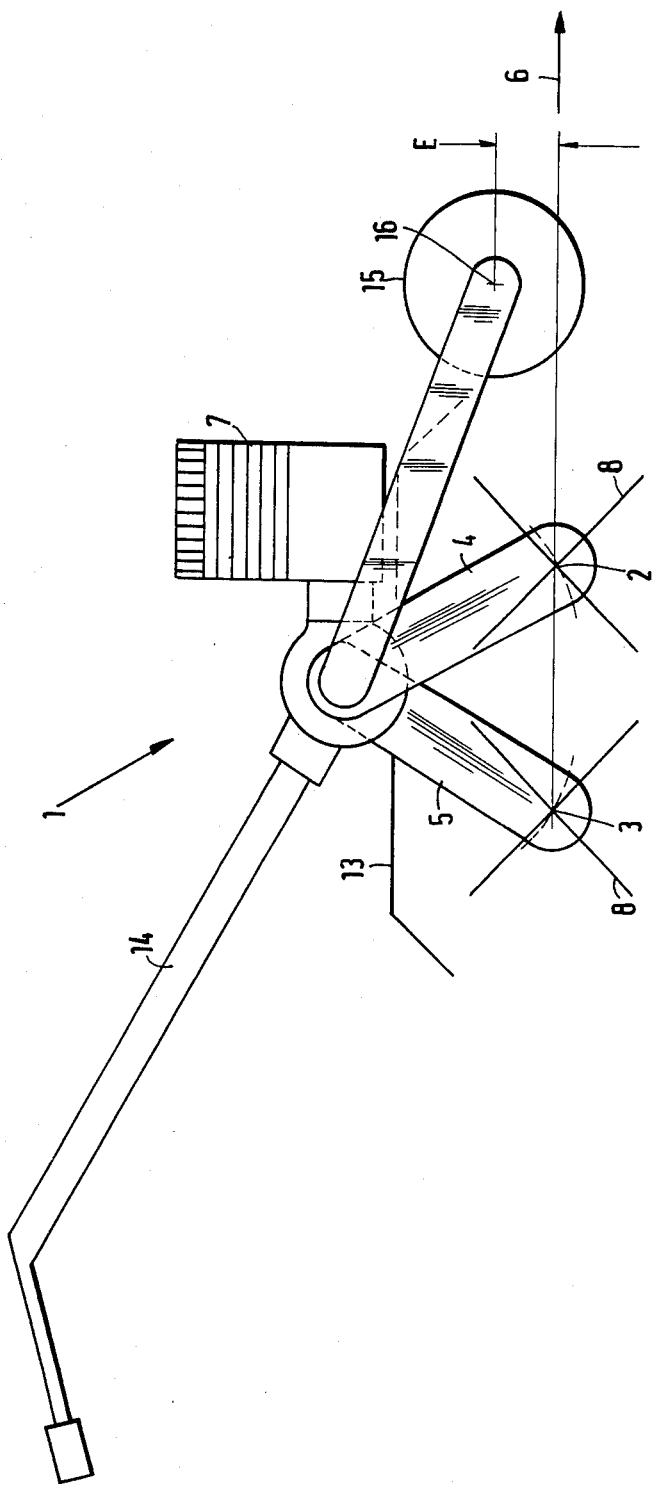

GROUND WORKING MACHINE FOR HOEING, TILLING AND THE LIKE

The invention concerns a ground-working machine for hoeing, tilling or similar, according the the nature of the Main Claim.

The German Pat. No. 1 782 434 (U.S. Pat. No. 3,773,112) proposes a motorized hand-held hoe, with two parallel shafts mounted one behind the other and crosswise to the direction of travel, equipped with hoeing tools and driven by a motor installed above the shafts. A transmission connects the motor and the shafts.

This known motorized hoe has several disadvantages. For example, the installation of various tools is limited by the diameter, and the adaptation of various tools to different ground conditions and changing types of ground work is equally limited. In addition, the range over which untouched, unloosened ground can be worked, is restricted by the use of a large, solid transmission.

Thus, the purpose of the present invention is to create a ground-working machine at reasonable cost and with a flexible design, which offers a better performance, allows a greater range, and which permits the use of tools with large diameters.

This purpose is met, on the one hand, by the fact that each of the power take-off shafts carrying the tools sits in its own transmission block, which is coupled to the motor, whereby these transmission blocks can swivel in relation to each other, in order to change the distances between the two power take-off shafts. The possibility to adjust the distance between the power take-off shafts permits the use of tools with various diameters, adapted to the conditions of the ground. If the ground to be worked contains large, solid elements such as, e.g., rocks or pieces of wood, one may choose to increase the distance between the power take-off shafts, in order to prevent obstructions between the power take-off shafts, their bearings and the tools, this also ensures a smooth operation free of interruptions, diminished risks, and increased safety, thanks to the avoidance of obstructions. For reasons of soil biology, a strongly mixed, finely grained soil is often undesirable—this is yet another reason to choose a larger distance between the power take-off shafts. If the ground to be worked is thickly overgrown, one may select a small distance between the power take-off shafts, so that plants and plant parts do not get entangled in the tools, but are reduced and mixed in, which ensures a smooth operation without the need to remove plant parts from the tools.

In addition, the purpose of the invention is met by the fact that the bearing points of the power take-off shafts, and therefore the power take-off shafts themselves, are laterally offset from each other in the direction of travel. As a result, the range of work will not be restricted—due to the placement of the transmission on untouched ground—underneath the transmission, because the tools of one power take-off shaft will work the untouched strip of ground near the other power take-off shaft. Thus, the entire area underneath the ground-working machine will be worked in one single operation, thereby avoiding reruns over the same surface area, which are sometimes impossible, particularly when cultivation in rows is practiced. Due to the lateral offset of the power take-off shafts, the tools are staggered in relation to each other, so that the individual bearing points do not have to be changed in order to use tools with large diameters.

The design proposed in the invention makes it possible to use symmetrical components at low cost, and ensures adaptation of the ground-working machine to the desired working conditions, the nature of the ground and the tools.

Thanks to the proposals made in the sub-claims, further advantageous developments and improvements are possible. Via one or two drive shafts, the transmission blocks may be coupled to the drive motor and the ground-working machine, whereby the drive shafts may be mounted parallel to each other over a certain distance—a design particularly suitable for large goundworking machines with high power output. Alternatively, the drive shafts may be aligned on a common straight line—a solution which is economical and particularly suitable for light-weight and small equipment.

If the power take-off shafts are designed in such a way that they can be extended by means of protruding extension elements, it will make sense to select a lateral offset between the bearing points of the power take-off shafts which corresponds to half, or a multiple of, the length of the extension element. This is so that in case of narrow axle distances, the tools mounted on both power take-off shafts will be staggered, and will not touch or block each other. In the case of counterrotating power take-off shafts, the power feed for the control of the work range, the work speed and the work intensity can be selected separately. It will be an advantage to design handheld ground-working machines equipped with a driving wheel in such a way that the power feed of the tools in the direction of travel will be largely halted when the power take-off shafts rotate in reverse, because the wheels thus driven will only require little power feed to move the ground-working machine in the direction of travel. As a result, it will be possible to design a light-weight and economical ground-working machine, with a safe and reliable performance.

The invention is shown in the drawings and is further explained in the following description. The figures show:

FIG. 5 is a side view of another embodiment of a hand-held ground-working machine, which is driven via one or more wheels.

Figure 1:
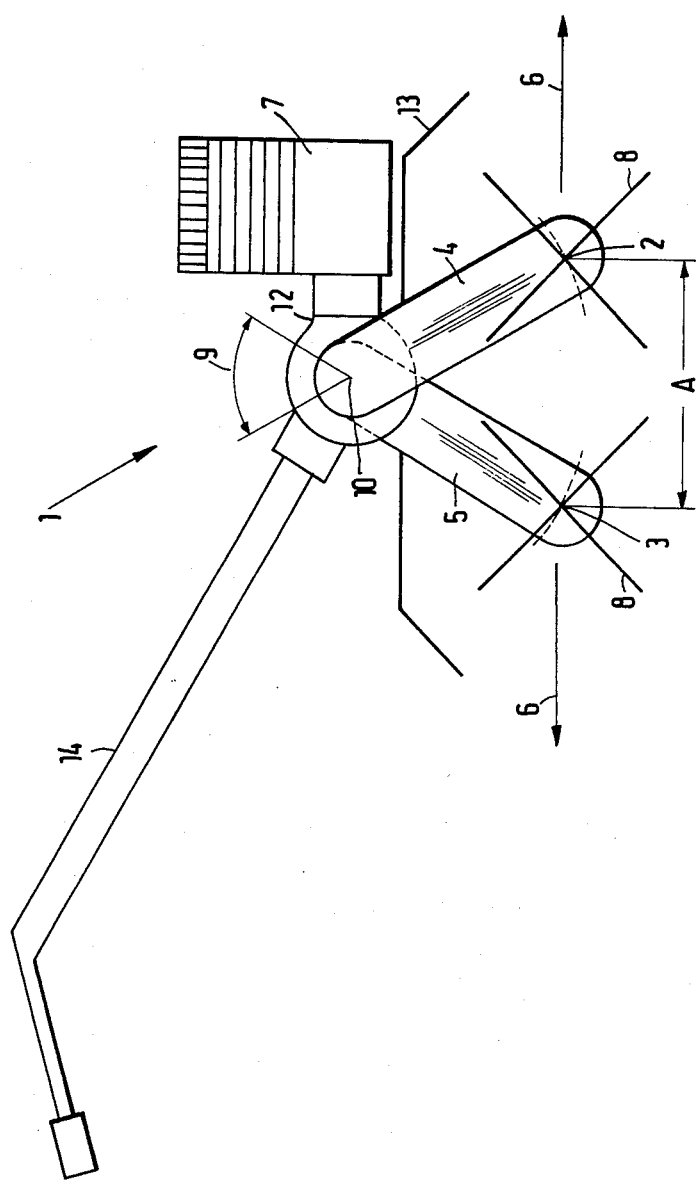
FIG. 1 is a side view of a hand-held ground-working machine.

The ground-working machine 1 shown in FIG. 1 may, for example, be designed to serve as a motorized hoe, a tiller or a similar piece of equipment. The ground-working machine 1 has two parallel power take-off shafts 2, 3, to which the tools 8 are attached. Depending on the application of the ground-working machine 1, these tools can be radial or disk-shaped hoeing blades, tillers, rollers, or similar. The power take-off shafts 2, 3 sit in transmission blocks, also referred to as drive transmission support frame means, 4, 5 which are driven, via a drive shaft 10, by a driving motor attached to the housing 12 of the ground-working machine, above the power take-off shafts. The transmission blocks 4, 5 may be equipped with V-belts with belt pulleys, sprockets, or cogwheels. Above tool 8, a protective cover 13 has been installed to shield the operator of the ground-working machine 1, and driving motor 7 from, among others, stones and clumps of dirt thrown up in the air. By means of a handlebar 14, connected to the housing 12 of the ground-working machine, the ground-working machine can be guided and, by means of various control elements not shown here, such as, e.g., brakes, throttle, coupling or similar, the driving motor 7 and the transmission blocks 4, 5, can be controlled.

The ground-working machine 1 may be used in a forward as well as a reverse direction; the direction of travel is indicated by arrow 6.

Figure 2:
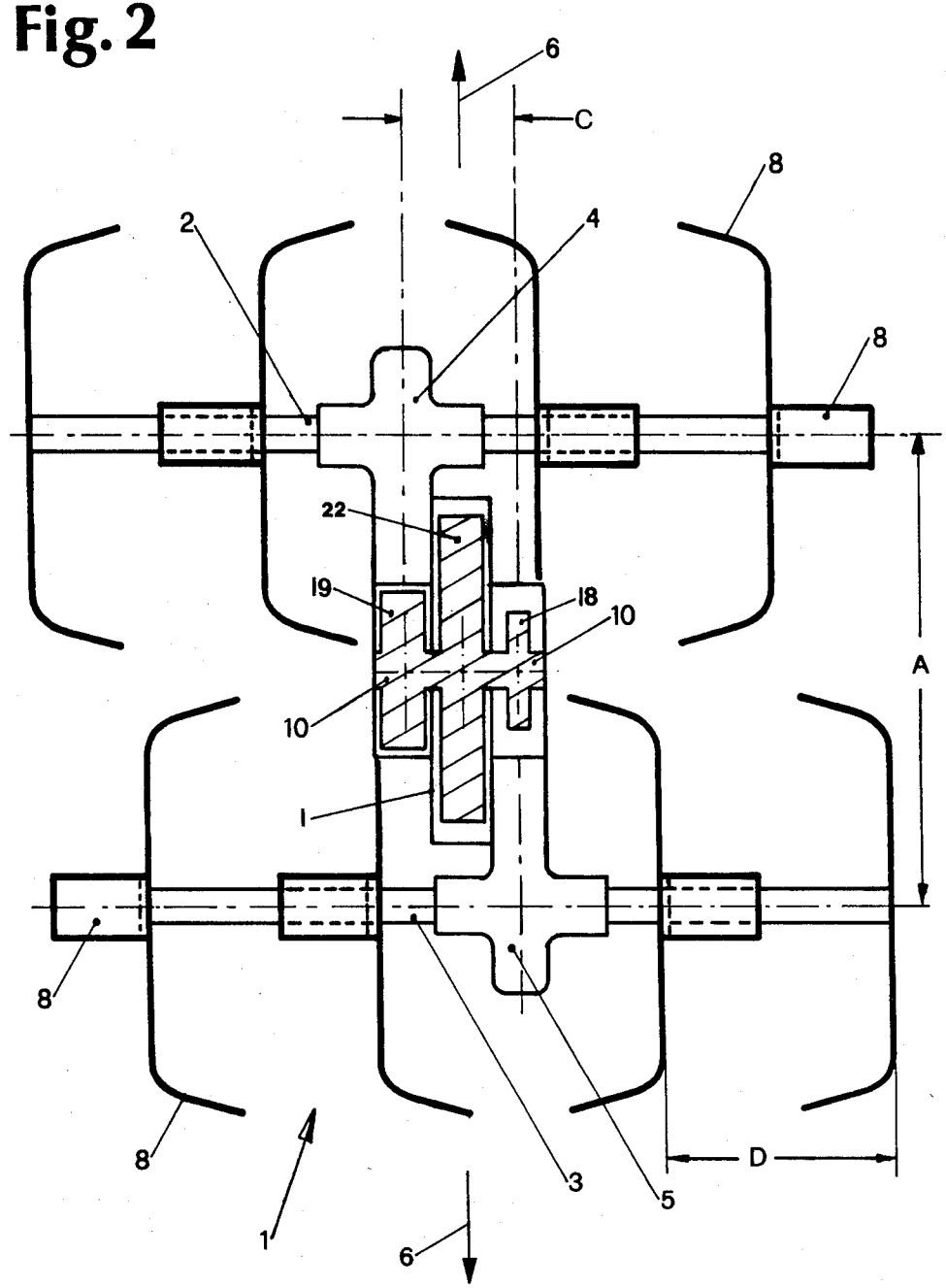
FIG. 2 is a plan view of one execution of the ground-working machine, in which the bearing points of the power take-off shafts are laterally offset.

FIG. 2 shows a schematic plan view of the ground-working machine 1, in which the driving motor 7, the cover 13, the housing 12 and the handlebar 14 have been left out for the sake of clarity. Each of the parallel power take-off shafts 2, 3, carries a number of tools 8, whereby the power take-off shafts may be extended by means of extension elements 11 which can be attached to them, thus increasing the number of tools 8. The power take-off shafts 2, 3 sit in the transmission blocks 4, 5, whereby the transmission blocks 4, 5, and the bearing points of the power take-off shafts 2, 3 are laterally offset from each other perpendicular to the direction of travel 6, over a distance C. In order to allow a tool 8, mounted on a power take-off shaft 3, to be staggered vis-a-vis a tool 8 mounted on the power take-off shaft 2—in case the diameter is larger than the one shown in FIG. 2—the rate of the lateral offset C of the bearing points of the power take-off shafts 2, 3, will correspond to half the length D of an extension element, or a multiple thereof. The drive shaft 10, which, engages drive gear 20, drives the power take-off shafts 2, 3 via the transmission blocks 4, 5, is shown in the center by means of a hatched area.

Figure 3:
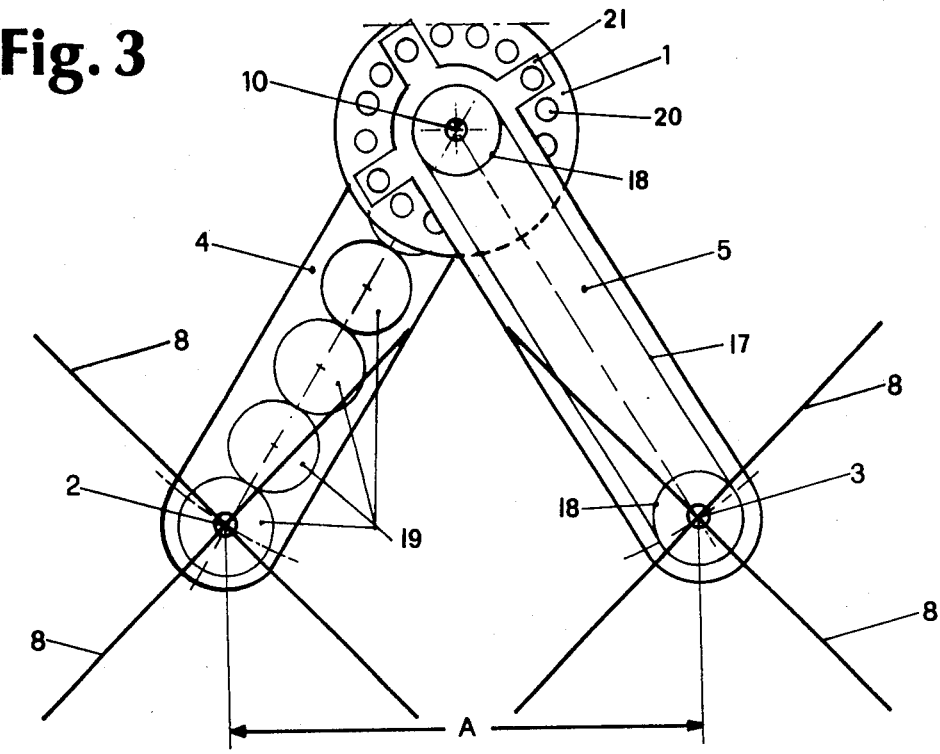
FIG. 3 is a partial view of the two transmission blocks used in the ground-working machine, mounted on a common drive shaft.

FIG. 3 shows a schematic side view of the mounting of the transmission blocks 4, 5 on one or two drive shafts 10, which are in alignment.

By swivelling one or both transmission blocks 4, 5 along the swivel axis of the drive shaft 10, the distance A between the power take-off shafts 2, 3, and thus the distance between the tools 8, can be adjusted in different ways. This means that the distance between the power take-off shafts 2, 3 can be adapted to the size of the tools, the condition of the ground to be worked, and the desired mode of operation. The setting of the transmission blocks 4, 5, and therefore the adjustment of the distance A between the power take-off shafts 2, 3, can be achieved by means of power and/or mechanical connections such as, for example, screw connections, or by means of spring or rubber devices. A double arrow 9 shows, in FIG. 1, the possibility of swivelling one or both of the transmission blocks 4, 5, along the swivel axis formed by the drive shaft 10, in order to change the distance A.

A typical exemplary transmission block is shown in the drawings and illustrates a conventional chain 17 mounted on sprockets 18 and comprising gears 19. The transmission blocks 4 and 5 are fixed to the machine 1 by parts 21 held by threaded elements 20.

Figure 4:
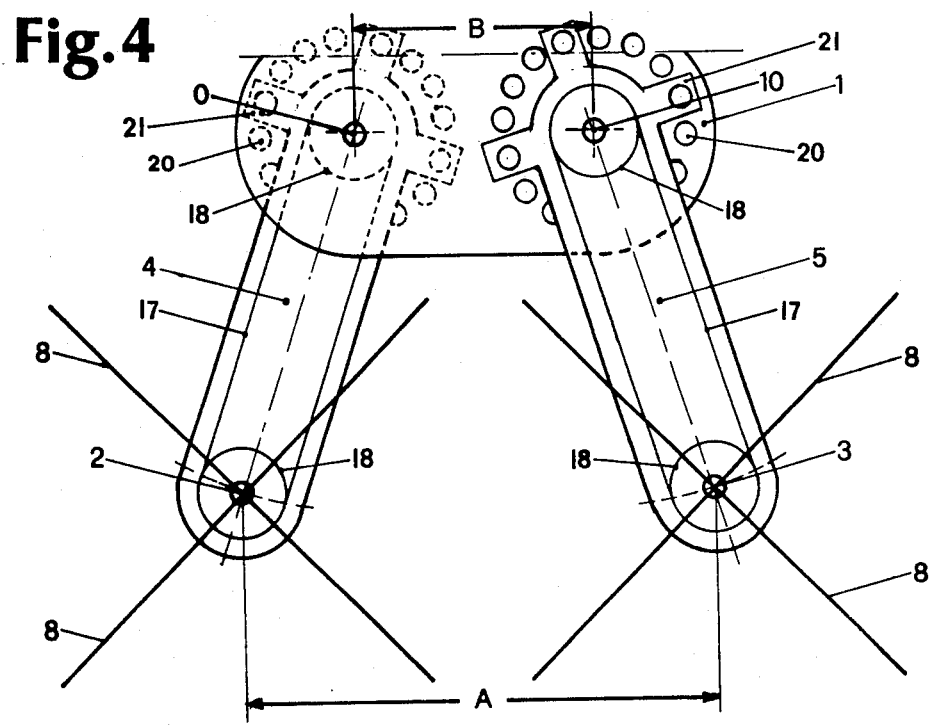
FIG. 4 is a partial view of the transmission blocks of another embodiment, in which the transmission blocks are mounted on parallel drive axles.

FIG. 4 corresponds to the representation in FIG. 3, except that the transmission blocks 4, 5 are mounted on parallel drive shafts 10, separated from each other by a distance B. The adjustment of distance A between the power take-off shafts 2, 3 is achieved, as in FIG. 3, by swivelling the transmission blocks 4, 5; in making this adjustment, the distance B has to be taken into account.

FIG. 5 shows a hand-held ground-working machine similar to the one in FIG. 1, but equipped with one or more wheels 15, driven by the motor 7. The distance E between the center(s) of the driven wheel(s) and the straight line connecting the centers of the power take-off shafts 2, 3, can be changed in a manner similar to the execution models according to FIGS. 3 and 4. This means that, for this execution example, the range of operation of the ground-working machine 1 can be adjusted.

When the ground-working machine 1 has been made ready for use, the direction of rotation of the power take-off shafts 2, 3 can be selected as desired. The power take-off shafts 2, 3 may both rotate in the same direction, or in directions opposite to each other, or vice versa. The reverse operation of the power take-off shafts 2, 3 makes it possible for the ground tools 8 to halt the power feed to a large extent. Consequently, the driven wheel(s) 15 will only require proportionally little feed power to move the ground-working machine 1 in the direction of travel. As a result, these ground-working machines can be designed at a lower cost, without endangering their reliability or safety.

The ground-working machine may be executed as a hand-held device, as shown in FIGS. 1 to 5, or it may be executed as additional equipment for tractors with one or two axles.

I claim:

1. A ground-working machine for hoeing, tilling, and the like comprising two motor-driven, rotating power take-off shafts, said shafts carrying ground-working tools, means for mounting said shafts on the machine crosswise to the direction of travel of the machine, a transmission drivingly engaging each of said shafts, means for coupling each transmission to a power source, and swivel mounting means for mounting said transmissions to swivel in relation to each other in order to change the distance between the two power take-off shafts taken in the direction of travel of the machine, said swivel mounting means allowing said shafts to swivel between a first position where the circles which are described by the tips of said ground-working tools when rotated overlap each other and a second position where said circles are free of overlap with each other.

2. A ground-working machine as claimed in claim 1 wherein each of said transmissions is attached to its respective power take-off shaft at a point of driving engagement, said points of driving engagement being located between the ends of each of said shafts and laterally offset from each other transverse to the direction of travel.

3. A ground-working machine as claimed in claim 1, wherein each of said transmissions is coupled to at least one drive shaft connectable to the power source.

4. A ground-working machine as claimed in claim 1, wherein said transmissions are coupled to two aligned drive shafts connectable to the power source, said drive shafts being parallel to each other.

5. A ground-working machine for hoeing, tilling and the like comprising two power operated, rotating power take-off shafts, said shafts carrying ground-working tools, means for mounting said shafts on the machine crosswise to the direction of travel of the machine, said means comprising an elongated drive transmission support frame means drivingly and supportingly engaging each of the said shafts, each of said drive transmission support frame means being operatively connectable at one end to a power source, each of said drive transmission support frame means being attached at its other end to its respective power take-off shaft at a point of driving engagement, said points of driving engagement being located between the ends of each of said shafts and laterally offset from each other transverse to the direction of travel.

6. A ground-working machine as claimed in claim 5, wherein the tools on the two shafts, taken together, are spaced apart crosswise so as to completely cultivate the ground across the entire transverse distance beneath said machine.

7. A ground-working machine as claimed in claim 5, further including means for coupling each of said drive transmission support frame means to a power source, swivel mounting means for mounting each of said drive transmission support frame means to swivel in relation to each other in order to change the distance between the two power take-off shafts, taken in the direction of travel of the machine, said swivel mounting means allowing said shafts to swivel between a first position where the circles which are described by the tips of said ground-working tools when rotated overlap each other and a second position where said circles are free of overlap with each other.

8. A ground-working machine as claimed in claim 5, wherein each of said drive transmission support frame means is coupled to at least one drive shaft connectable to the power source.

9. A ground-working machine as claimed in claim 5, wherein said drive transmission support frame means are coupled to two aligned drive shafts connectable to the power source, said drive shafts being parallel to each other.

10. A ground-working machine as claimed in claims 2 or 5, wherein said shafts can be extended transversely by means of extension elements, and wherein the lateral offset of said points of driving engagement corresponds to half the length of the extension elements or a multiple of half the length of the extension elements.

11. A ground-working machine as claimed in claims 1 or 5, wherein the direction of rotation of at least one of said power take-off shafts can be reversed.

12. A ground-working machine as claimed in claims 1 or 5, further including a driving wheel, means for mounting said driving wheel on the machine, and means for transmitting power from the power source to said driving wheel.

13. A ground-working machine as claimed in claim 12, wherein the distance between the center of said driving wheel and the extended line connecting the centers of said power take-off shafts is adjustable.

14. A gound-working machine as claimed in claim 13, wherein said power take-off shafts can rotate in the opposite direction.

* * * * *